(12) United States Patent
Harberts et al.

(10) Patent No.: US 8,276,330 B2
(45) Date of Patent: Oct. 2, 2012

(54) MODULAR SOLAR PANEL RACKING SYSTEM

(75) Inventors: John Henry Harberts, Clinton Township, MI (US); John Edward Klinkman, Clinton Township, MI (US)

(73) Assignee: Applied Energy Technologies, Saline, MI (US)

( * ) Notice: Subject to any disclaimer, the term of this patent is extended or adjusted under 35 U.S.C. 154(b) by 170 days.

(21) Appl. No.: 12/605,513

(22) Filed: Oct. 26, 2009

(65) Prior Publication Data

US 2010/0147359 A1 Jun. 17, 2010

Related U.S. Application Data (60) Provisional application No. 61/122,248, filed on Dec. 12, 2008.

(51) Int. Cl.
*E04D 13/18* (2006.01)
*E04H 14/00* (2006.01)

(52) U.S. Cl. ............... 52/173.3; 52/747.1; 136/244

(58) Field of Classification Search ........... 52/27, 173.3, 52/741.1, 747.1, 747.7; 136/243–252; 248/237, 248/910
See application file for complete search history.

(56) References Cited

U.S. PATENT DOCUMENTS

| | | | |
|---|---|---|---|
| 4,226,256 A * | 10/1980 | Hawley ................. | 136/244 |
| 4,269,173 A * | 5/1981 | Krueger et al. .......... | 126/634 |
| 4,371,139 A | 2/1983 | Clark | |
| 4,677,248 A | 6/1987 | Lacey | |
| 5,125,608 A * | 6/1992 | McMaster et al. ........ | 248/163.1 |
| 5,289,999 A | 3/1994 | Naujeck et al. | |
| 5,505,788 A | 4/1996 | Dinwoodie | |
| 6,046,399 A * | 4/2000 | Kapner ................. | 136/244 |
| 6,105,316 A | 8/2000 | Bottger et al. | |
| 6,465,724 B1 | 10/2002 | Garvison et al. | |
| 6,534,703 B2 | 3/2003 | Dinwoodie | |
| 6,584,737 B1 | 7/2003 | Bradley, Jr. | |
| 6,606,823 B1 | 8/2003 | McDonough et al. | |
| D496,249 S | 9/2004 | Liebendorfer | |
| 6,786,012 B2 | 9/2004 | Bradley, Jr. | |
| 6,809,251 B2 | 10/2004 | Dinwoodie | |
| 6,930,238 B2 | 8/2005 | Makita et al. | |
| 6,968,654 B2 | 11/2005 | Moulder et al. | |
| RE38,988 E | 2/2006 | Dinwoodie | |
| 7,102,074 B2 | 9/2006 | Yen et al. | |
| 7,434,362 B2 * | 10/2008 | Liebendorfer ............ | 52/173.3 |
| 2003/0070368 A1 * | 4/2003 | Shingleton .............. | 52/173.3 |
| 2005/0115171 A1 | 6/2005 | Russell | |
| 2005/0172953 A1 * | 8/2005 | Klein .................... | 126/580 |
| 2006/0053706 A1 * | 3/2006 | Russell ................. | 52/173.3 |
| 2006/0266352 A1 | 11/2006 | Marston et al. | |
| 2007/0095388 A1 | 5/2007 | Mergola et al. | |

(Continued)

*Primary Examiner* — Brian Glessner
*Assistant Examiner* — Brian D Mattei
(74) *Attorney, Agent, or Firm* — Young Basile (57) ABSTRACT

Disclosed herein are embodiments of modular racking systems for solar panels and in particular, modular solar panel racks, racking systems, arrays of racks, kits and methods of use. One embodiment of a modular solar panel rack comprises a plurality of discrete ballast holders and a plurality of panel support members each having two upright portions, a transverse portion contiguously connected between the two upright portions, the connection such that the transverse portion is non-perpendicular to the two upright portions, and a retainer attached to the transverse portion and configured to retain a solar panel. Each of the plurality of ballast holders is connected to no more than four panel support members, each ballast holder perpendicularly connected to one of the upright portions.

16 Claims, 7 Drawing Sheets

U.S. PATENT DOCUMENTS

| | | |
|---|---|---|
| 2007/0212935 A1 | 9/2007 | Lenox |
| 2007/0246039 A1 | 10/2007 | Brazier et al. |
| 2008/0010915 A1 | 1/2008 | Liebendorfer |
| 2008/0029144 A1 | 2/2008 | Brazier et al. |
| 2008/0251115 A1 * | 10/2008 | Thompson et al. ........... 136/251 |
| 2009/0007901 A1 | 1/2009 | Luconi et al. |
| 2009/0019796 A1 | 1/2009 | Liebendorfer |
| 2009/0095285 A1 | 4/2009 | Klein |
| 2009/0320904 A1 * | 12/2009 | Botkin et al. ................. 136/251 |

* cited by examiner

MODULAR SOLAR PANEL RACKING SYSTEM

CROSS-REFERENCE TO RELATED APPLICATION

This application claims priority from U.S. Provisional Application Ser. No. 61/122,248, filed on Dec. 12, 2008, which is incorporated herein in its entirety by reference.

FIELD OF THE INVENTION

The present invention relates in general to roof mounting systems for solar panels and in particular, to modular solar panel rack, racking systems, arrays of racks and methods of use.

BACKGROUND

Solar panels are becoming an increasingly useful means of providing renewable energy for commercial and residential properties. Mounting solar panels correctly is crucial to maximizing energy production, and it is also an import way to protect the solar panels from the force of natural elements. The proper solar panel mounting provides stability and the proper directional and latitudinal orientation for the solar array. Solar panels can be mounted on the roof, the ground, or on a pole, for example. The different mounting systems pose different challenges. These challenges include simplifying installation and maximizing use of space.

BRIEF SUMMARY

Disclosed herein are embodiments of modular solar panel racks, racking systems, arrays to position solar panels, kits, and methods of use. One embodiment of a modular solar panel rack comprises a plurality of discrete ballast holders and a plurality of panel support members each having two upright portions, a transverse portion contiguously connected between the two upright portions, the connection such that the transverse portion is non-perpendicular to the two upright portions, and a retainer attached to the transverse portion and configured to retain a solar panel. Each of the plurality of ballast holders is connected to no more than four panel support members, each ballast holder perpendicularly connected to one of the upright portions.

An embodiment of a modular racking system for solar panels disclosed herein comprises at least one end unit, each end unit comprising at least one discrete ballast holder and a panel support member having two upright portions, a transverse portion contiguously connected between the two upright portions, the connection such that the transverse portion is non-perpendicular to the two upright portions, and a retainer attached to the transverse portion and configured to retain a solar panel. The at least one discrete ballast holder is removably connected to one of the upright portions in a perpendicular arrangement. The system also comprises at least one center unit, each center unit comprising at least one discrete ballast holder and a pair of panel support members. The at least one discrete ballast holder is connected to one of the upright portions of each panel support member in a substantially perpendicular arrangement such that the panel support members are in spaced parallel relationship to each other, with the discrete ballast holder sized to span the spaced pair.

An embodiment of an array for removably positioning a plurality of solar panels as disclosed herein comprises a plurality of discrete ballast holders configured to rest in overlying relationship to a planar support surface and configured in spaced relationship to one another; a plurality of panel support members, each support member having two upright portions, a transverse portion contiguously connected between the two upright portions, the connection such that the transverse portion is non-perpendicular to the two upright portions, and a retainer attached to the transverse portion and configured to retain a solar panel; ballast material removably positioned in more than one of the discrete ballast holders; and at least two solar panels, each solar panel having a top edge, a bottom edge and two opposed side edges, each solar panel attached to two of the plurality of panel support members with the retainer. Each of the plurality of discrete ballast holders is connected to no more than four of the panel support members.

An embodiment of a kit for orienting a plurality of unitary solar panels as disclosed herein comprises at least two end unit elements, the end unit elements each including at least one ballast holder, a at least one solar panel support member attachable to the ballast holder and means for connecting the at least one ballast holder to the solar panel support member; and at least one center unit element, the center unit element including two discrete ballast holders, at least two solar panel support members attachable to the ballast holders and means for connecting the respective ballast holders to the solar panel support members. The respective ballast holders are configured to removably receive a ballast material.

Embodiments of methods of positioning two or more solar panels are also disclosed herein. One embodiment of a method of positioning two or more solar panels in an array comprises orienting at least three panel supports in linear relationship to one another on a support substrate. Each panel support comprises at least one transverse portion contiguously connected between opposed upright portions; a retainer attached to the at least one transverse portion and configured to retain a solar panel; at least one ballast holder connected to a respective upright; and discrete ballast members in each discrete ballast holder. At least two solar panels are positioned in overlying relationship to two of the at least three panel supports and in abutting relationship to one another such that the abutting solar panels form an abutment junction seam, the solar panels positioned such that the abutment junction seam is located medial between and parallel to two transverse portions connected to the same discrete ballast holder. The positioned solar panels are retained in affixed relationship to the panel support.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Embodiments of a modular solar panel rack are described herein for mounting a plurality of solar panels to any surface exposed to sunlight, e.g., a roof surface of a building or the ground.

One embodiment of a modular solar panel rack is shown in FIGS. 1 and 2A-D.

Figure 1:
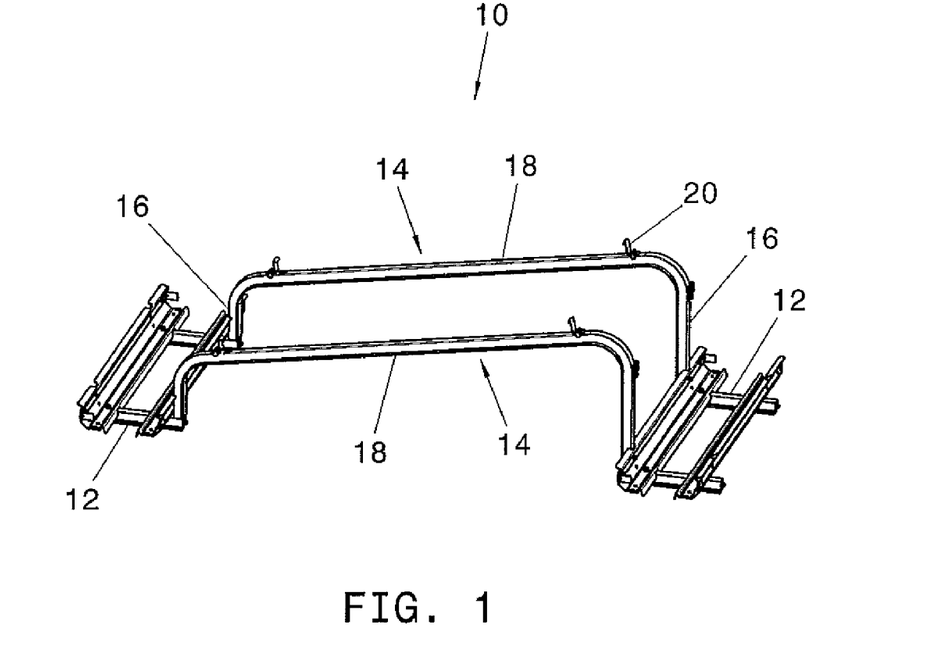
FIG. 1 is a perspective view of an embodiment of a solar panel rack as disclosed herein.

FIG. 1 is a perspective view of a solar panel rack 10 comprising a plurality of discrete ballast holders 12 and a plurality of panel support members 14 each having two upright portions 16, a transverse portion 18 contiguously connected between the two upright portions 16, the connection such that the transverse portion 18 can be perpendicular or non-perpendicular, or at an angle, to the two upright portions 16 as required, and a retainer 20 attached to the transverse portion 18 and configured to retain a solar panel.

Figure 2A:
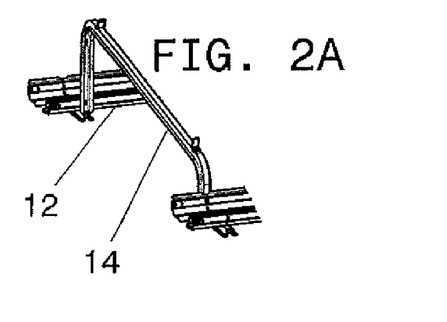
FIGS. 2A-2D are perspective views of other embodiments of solar panel racks as disclosed herein.
Figures 2B, 2C:
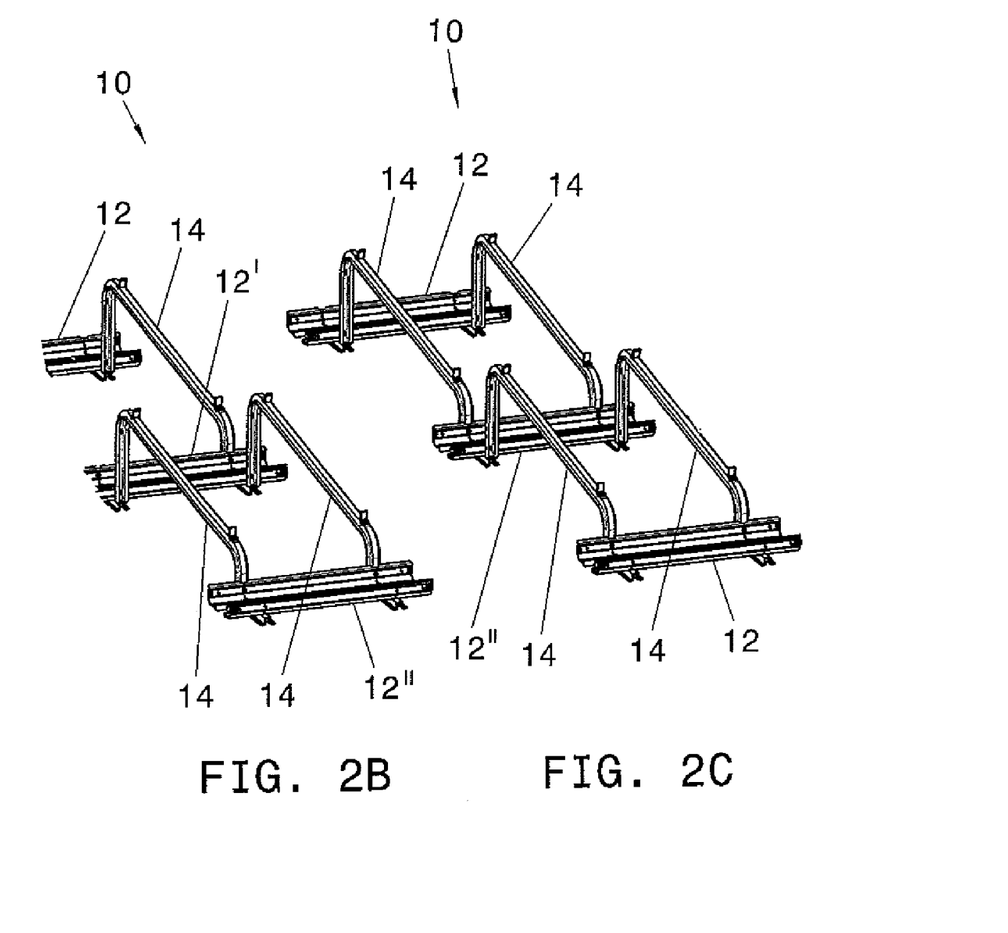
Figure 2D:
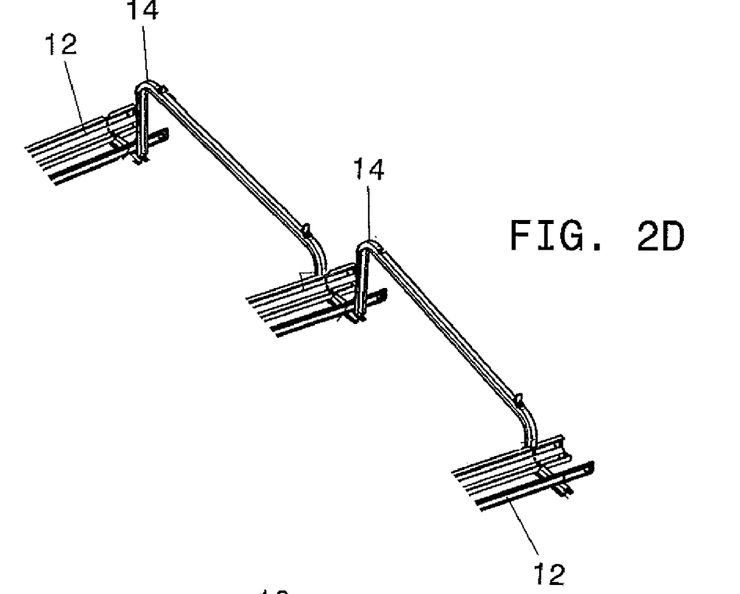

Each of the plurality of ballast holders 12 is connected to no more than four panel support members 14, each ballast holder 12 perpendicularly connected to one of the upright portions 16 of a panel support member. As shown in FIG. 2A, ballast holder 12 is connected to one panel support member 14. As shown in FIG. 2B, ballast holder 12 is connected to one panel support member 14, ballast holder 12' is connected to three panel support members 14, and ballast holder 12" is connected to two panel support members 14. In FIG. 2C, ballast holders 12 are connected to two panel support members 14 and ballast holder 12' is connected to four panel support members 14. In FIG. 2D, ballast holders 12 are connected to one panel support member 14 and ballast holder 12' is connected to two panel support members 14. As seen in the Figures, the ballast holders 12 are connected to the panel support members 14 at one of the upright portions 16.

Each modular solar panel rack is configured to interface with another modular solar panel rack, thereby allowing an interconnected series of solar panels to be installed. This interface is typically between a ballast holder 12 of one rack and one or more upright portions of panel support members of another rack.

Figure 3:
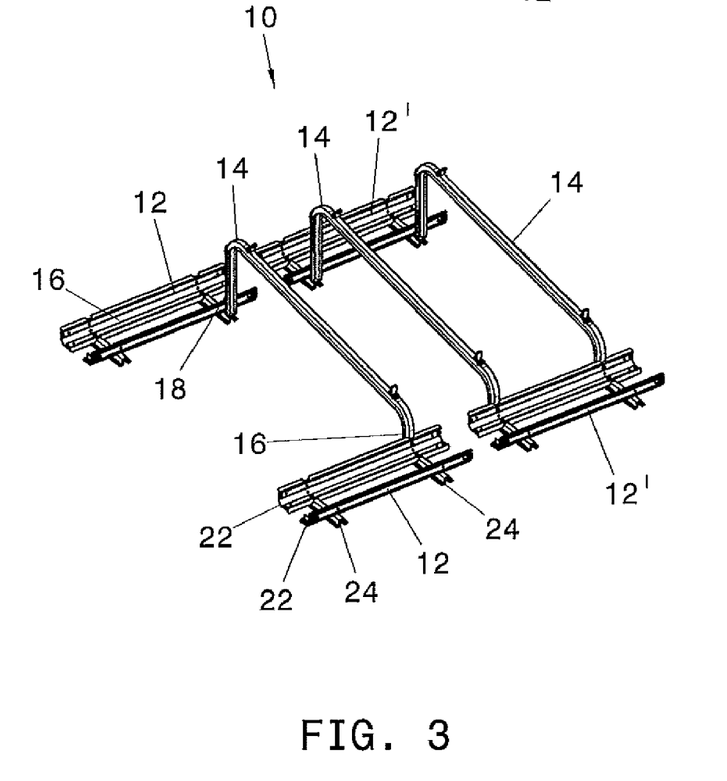
FIG. 3 is a perspective view of both and end unit and a center unit of a modular solar panel racking system as disclosed herein.

As shown in FIG. 3, an embodiment of the modular solar panel rack 10 can comprise at least one discrete ballast holder 12 connected to a single panel support member 14 in a substantially perpendicular arrangement and at least one discrete ballast holder 12' connected to a pair of panel support members 14 in a substantially perpendicular arrangement such that the panel support members 14 are in spaced parallel relationship to each other, with the discrete ballast holder 12' sized to span the spaced pair.

Also shown in FIG. 3, each ballast holder 12, 12' comprises at least two elongate members 22 and at least two cross beams 24. The panel support member 14 is connected substantially perpendicular to at least one of the elongate members 22 at one of its upright portions 16. As used herein, elongate is used to define the portions of the ballast holder 12 perpendicular to the panel support member 14. It is contemplated that the cross beams 24 can be of the same length as the elongate members if desired or required. However, the racks herein maximize space by maintaining a lower profile ballast system by using as small of cross beams as possible while still supporting the required ballast.

As used herein, "discrete" ballast holder refers to an individual ballast holder that does not abut any other ballast holder when in a rack. The ballast holders can be any length desired or required as long as they remain discrete from each other. As described herein, a ballast holder connected to a pair of panel support members typically spans and overlaps the pair of support members as shown in the Figures. A ballast holder connected to a single panel support member can be any size sufficient to hold the required ballast material, while remaining discrete. The ballast can be any weight sufficient to hold down the racks with solar panels against the elements. It is contemplated that the racking units and systems herein can be fixedly attached to the substrate on which they are to be installed, such as a roof, as desired or required. Extension of the ballast holders can be used to make an unballasted system more secure.

Figure 4:
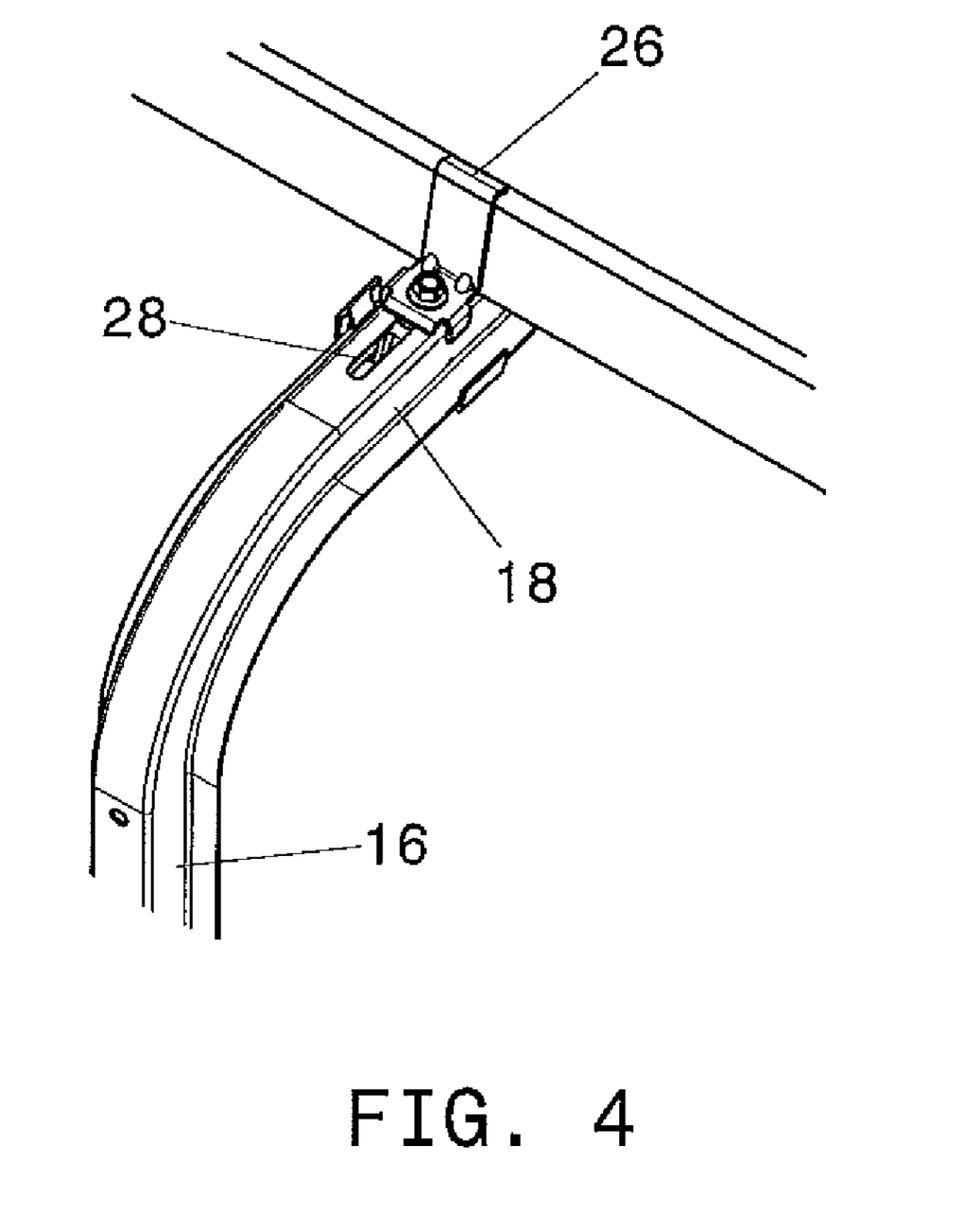
FIG. 4 is an enlarged perspective view of a retainer to retain a solar panel as disclosed herein.

The retainers 20 used to retain the solar panels on the rack can be any retainer known to those skilled in the art that is suitable for use with the panel support member. As example of a retainer 20 is an adjustable retainer movably connected to adjust to a plurality of widths of solar panels. As shown in FIG. 1, the retainer 20 can comprise of a pair of attachment fixtures, each attachment fixture proximate an end of the transverse portion 18. At least one of the attachment fixtures 26 is movable along at least a portion of the transverse portion 18. This is shown in FIG. 4. The attachment fixture 26 is shown as a top down Z-clip. A slot 28 is formed in the transverse portion 18 to allow for movement of the attachment fixture 26 along the slot. The attachment fixture 26 is adjusted to conform to various sizes of solar panels. The adjustable attachment fixture 26 is not limited to this embodiment. It is contemplated that the attachment fixture 26 can be movably attached to the transverse portion 18 without the use of the slot. As a non-limiting example, the attachment portion may include a cuff that surrounds the transverse portion and that can be tightened and loosened as desired or required to move the location of the attachment fixture. It is further contemplated that the retainer be one fixture having grips at opposed ends of the fixture. The fixture can be configured to telescope to adjust to varying widths of solar panels.

The modular solar panel rack can be made entirely of stainless steel. Stainless steel provides a material that will withstand the outdoor elements for an extended period of time without rusting. It is also contemplated that only one or both of the ballast holders and the panel support members are made of stainless steel. Other materials can be used as desired or required, but will not afford the advantages of stainless steel.

An electrical grounding path for each solar panel can be provided that allows an electrical ground path to run from along the modular solar panel racks to include the solar panels, thereby allowing the connection of multiple solar panels in a series. Because the modular solar panel racks are formed of a conductive material, e.g., stainless steel, the racks may thereby be utilized as a portion of the electrical grounding path. Utilizing the racks are part of the electrical grounding path also reduces the number of grounding clips which are required, thereby saving a significant cost.

Embodiments of the modular solar panel rack disclosed herein have been designed to include a water management system. The cross beams 24 of the ballast holders 12, as shown in FIG. 3, are formed with minimal surface area overlying the support surface, i.e. roof surface, and are also configured to raise the ballast material off of the support surface. This design allows water collected on the support surface to properly drain from the roof and not collect between the rack and the support surface. This prevents, for example, the creation of stagnant water in warmer weather and ice dams in colder weather. Because the ballast holders 12 comprise elongate portions 22 that are configured such that the ballast holder 12 has an open floor, water also does not collect in the ballast holder itself.

As noted above, the transverse portion 18 of the panel support member 14 is contiguously connected between the two upright portions 16 such that the transverse portion 18 can be non-perpendicular to the two upright portions 16. The angle resulting from the non-perpendicular configuration of the transverse portion 18 to the upright portions 16 provides the angle at which the solar panel will relate to the sun. This angle can be any angle desired or required by those skilled in the art to maximize the output of the solar panels while maximizing space. As a non-limiting example, the angle can be a ten degree angle from the support surface. However, the transverse portion 18 can also be perpendicular, meaning the solar panel is parallel to the substrate on which the rack is placed.

Also disclosed herein are modular racking systems for solar panels. These modular racking systems utilize components from the modular solar panel racks described above. Therefore, detailed descriptions of the repeated components will refer to those discussions above.

Figure 5:
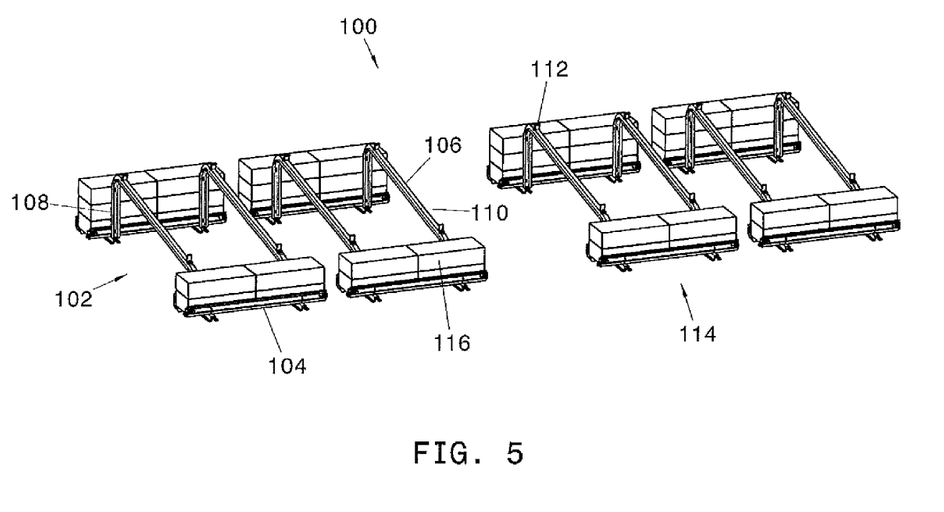
FIG. 5 is a perspective view of an embodiment of a modular solar panel racking system as disclosed herein.

An embodiment of a modular racking system 100 for solar panels is shown in FIG. 5 and can comprise at least one end unit 102. Each end unit 102 comprises at least one discrete ballast holder 104 and at least one panel support member 106 having two upright portions 108, a transverse portion 110 contiguously connected between the two upright portions 108, and a retainer 112 attached to the transverse portion 110 and configured to retain a solar panel. The at least one discrete ballast holder 104 is removably connected to one of the upright portions 108 of the at least one panel support member 106 in a perpendicular arrangement. The system 100 also can comprise at least one center unit 114. Each center unit 114 comprises at least one discrete ballast holder 104 and a pair of panel support members 106. The at least one discrete ballast holder 104 is connected to one of the upright portions 108 of each panel support member 106 in a substantially perpendicular arrangement such that the panel support members 106 are in spaced parallel relationship to each other, with the discrete ballast holder 104 sized to span the spaced pair.

The modular racking system 100 can further comprise ballast material 116 movably positioned in a plurality or all of the discrete ballast holders 104 as required to maintain the system against the support surface during various weather conditions. The ballast material can be any material of sufficient weight per volume to effectively maintain the system against the support surface. Non-limiting examples include cement, brick, sand, water, etc.

As shown in FIG. 5, the modular racking system 100 can comprise one or more end units 102 having two discrete ballast holders 104 each connected on an opposing upright portion 108 of two panel support members 106 as an alternative to one panel support member 106. A number of the center units 114 can comprise two discrete ballast holders 104 connected to opposing upright portions 108 of the pair of panel support members 106.

As described above and shown in FIG. 3, each ballast holder 104 can comprise at least two elongate members 22 and at least two cross beams 24. The panel support member 106 can be connected substantially perpendicular to at least one of the elongate members 22 at one of its upright portions 16.

As described above and shown in FIG. 4, the retainer can be an adjustable retainer movably connected to the transverse portion to adjust to a plurality of widths of solar panels. The retainer can comprise a pair of attachment fixtures, each attachment fixture positioned proximate an end of the transverse portion, wherein at least one of the attachment fixtures is movable along at least a portion of the transverse portion.

Figure 6:
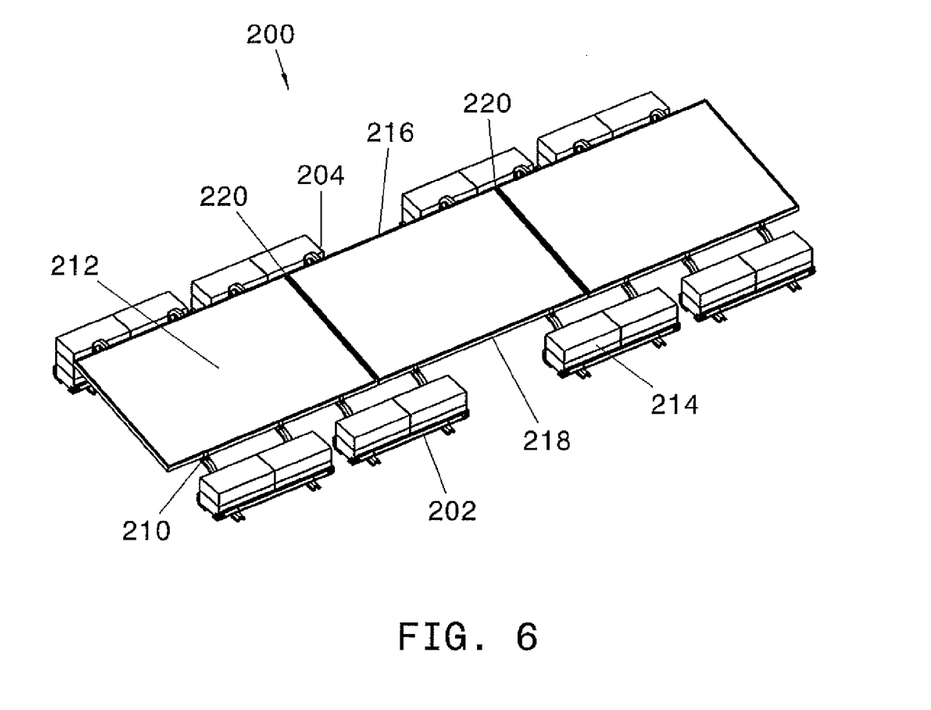
FIG. 6 is a perspective view of an embodiment of an array for removably positioning a plurality of solar panels as disclosed herein.

Also disclosed herein are embodiments of arrays for removably positioning a plurality of solar panels. One embodiment of an array 200 is shown in FIG. 6 and comprises a plurality of discrete ballast holders 202 configured to rest in overlying relationship to a planar support surface and configured in spaced relationship to one another. The array 200 also comprises a plurality of panel support members 204. Each support member 204 has two upright portions, a transverse portion contiguously connected between the two upright portions, and a retainer 210 attached to the transverse portion and configured to retain a solar panel 212. Ballast material 214 can be removably positioned in more than one or all of the discrete ballast holders 202. The array 200 comprises at least two solar panels 212, each solar panel 212 having a top edge 216, a bottom edge 218 and two opposed side edges 220. Each solar panel 212 is attached to two of the plurality of panel support members 204 with the retainer 210, each of the two panel support members being attached to a different ballast holder 202 as shown. Each of the plurality of discrete ballast holders 202 is connected to no more than four of the panel support members 204.

As shown in FIG. 6, at least one of the plurality of discrete ballast holders 202 of the array 200 can be removably connected to at least one of the plurality of panel support members 204 in a substantially perpendicular arrangement. At least one of the plurality of ballast holders 202 can be removably connected to a pair of the plurality of panel support members 204 such that the pair of panel support members 204 are spaced in parallel relationship to one another and substantially perpendicular to the ballast holder 202. Abutting side edges 220 of two adjacent solar panels 212 are aligned between the pair of panel support members 204.

Figure 7:
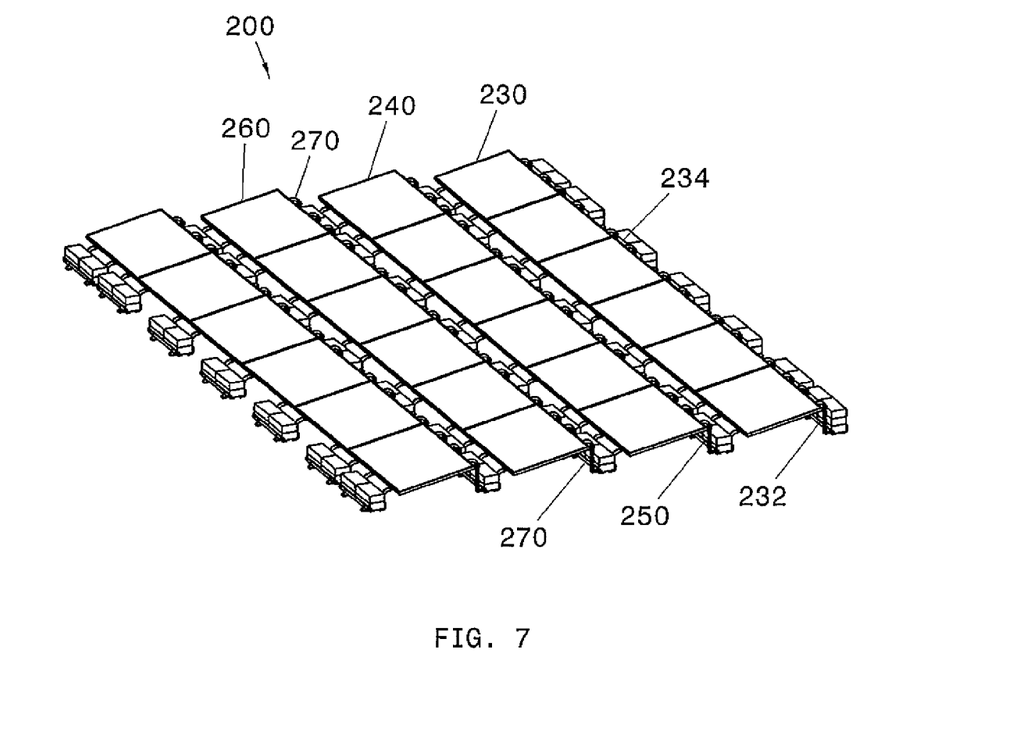
FIG. 7 is a perspective view of another embodiment of an array for removably positioning a plurality of solar panels as disclosed herein.

As shown in FIG. 7, the array 200 can have a first row 230 comprising up to two end units 232 and any number of center units 234. Each end unit 232 comprises two discrete ballast holders 202 and a panel support member 204 extending substantially perpendicular there between. This arrangement is best shown in FIG. 1. The center units 234 each comprise two discrete ballast holders 202 and a pair of panel support members 204 extending there between and spaced in parallel relationship to one another and substantially perpendicular to the ballast holders 202. The center units 234 are typically positioned between and in spaced relationship to the end units 232. The arrangement of a center unit 234 can best be seen in FIG. 3. The arrangement of at least one center unit 234 between two end units 232 can best be seen in FIG. 5. As shown, the units are arranged so that the panel support members 204 of each unit in the array 200 are substantially parallel to one another.

The distance that the end units and center units are spaced from each other is determined by the size of the solar panel 212 to be supported. It existing solar panel mounting systems, the system is designed for a particular size of solar panel, or even a particular size and make of solar panel. The modular systems and arrays disclosed herein can be used with a wide range of sizes and models of solar panels. As noted above, abutting side edges 220 of two adjacent solar panels 212 are aligned between the pair of panel support members 204 of a center unit 234. Therefore, after an end unit 232 is positioned, a center unit 204 is positioned spaced from the end unit 234 such that the side 220 of the solar panel 212 opposite the end unit 232 aligns between the pair of panel support members 204 of the center unit 234.

The number of center units 234 between the two end units 232 is not limited. The number will depend on the size of the support surface on which the solar panels are to be mounted, the number of solar panels to be mounted and/or the length of the solar panels.

The array 200 can further have at least one additional row 240. Each additional row 240 can comprise up to two end units each comprising one discrete ballast holder 202 and at least one panel support member 204 extending substantially perpendicular there from.

Each additional row 240 can also comprise at least one center unit comprising one discrete ballast holder 202 and a pair of panel support members 204 spaced in parallel relationship to one another and substantially perpendicular to the ballast holder 202. The at least one center unit can be positioned between and in spaced relationship to the end units. The at least one additional row 240 is connected to the first row 230 such that the upright portion 250 of the panel support members 204 opposed to the discrete ballast holders 202 of the additional row 240 is connected to the nearest discrete ballast holder 202 of the first row 230.

As shown in FIG. 7, the array 200 can have a plurality of additional rows. As shown, a subsequent additional row 260 is connected to a preceding additional row 240 such that the upright portion 270 of the panel support members 204 opposed to the discrete ballast holders 202 of the subsequent additional row 260 is connected to the nearest discrete ballast holder 202 of the preceding additional row 240.

As described above and shown in FIG. 3, each ballast holder 202 can comprise at least two elongate members 22 and at least two cross beams 24. The panel support member 204 can be connected substantially perpendicular to at least one of the elongate members 22 at one of its upright portions 16.

As described above and shown in FIG. 4, the retainer can be an adjustable retainer movably connected to the transverse portion to adjust to a plurality of widths of solar panels. The retainer can comprise a pair of attachment fixtures, each attachment fixture positioned proximate an end of the transverse portion, wherein at least one of the attachment fixtures is movable along at least a portion of the transverse portion.

Also disclosed herein are embodiments of a solar panel array kit. One embodiment of a solar panel array kit comprises at least two unit elements 10, as shown in FIG. 1. Each unit element includes at least one ballast holder 12, at least one solar panel support member 14 attachable to the ballast holder 12 and means for connecting the at least one ballast holder 12 to the solar panel support member 14. The respective ballast holders 12 are configured to removably receive a ballast material 116, shown in FIG. 5. It is contemplated that the ballast material may or may not be included in the kit as desired or required by those skilled in the art. Shipping the kit would be more economical without the ballast material.

The solar panel array kit can further comprise a plurality of solar panel retention clips 210 and a plurality of solar panels 212, as shown in FIG. 6. The solar panels 212 can be configured to be placed in overlying relationship with the panel support members 14, 204 when the respective unit elements are in spaced relationship on a substrate surface, such as a roof. The solar panel retention clips 26, 210 can be movably positionable on the respective solar panel support member, for example, as shown in FIG. 4.

Each ballast holder of each central unit element can be configured to be connected to up to two additional solar panel support members from up at least one additional end unit or center unit, as shown in FIGS. 2B, 2C and FIG. 7. As described above, the respective solar panel support members can each include a pair of opposed uprights in parallel relationship to one another and a transverse portion contiguously connected between the two uprights, the connection such that the transverse portion is non-perpendicular to the two upright portions. The panel support member can be integrally formed, such as, for example, by a single piece of bent material. It is also contemplated that the panel support member consists of separate uprights and a transverse bar that are either preassembled to form the support member or are shipped in pieces for assembly prior to installation. In addition, the ballast holders can be assembled to the support members prior to shipment of the kit or after shipment during installation.

Also disclosed herein are methods of positioning two or more solar panels in an array. One embodiment of a method of positioning two or more solar panels in an array comprises positioning a plurality of panel supports in spaced fixed relation on a supporting substrate and affixing at least two solar panel units in overlying relationship to at least two discrete panel supports such that the two respective solar panels form an abutment junction seam, the abutment junction seam located medial between and parallel to the associated panel supports.

Positioning the plurality of panel supports can comprise orienting at least two end panel supports and at least one intermediate panel support in linear relationship to one another on the support substrate. Each end panel support can comprise opposed upright portions, a transverse portion contiguously connected between the opposed upright portions, the connection such that the transverse portion is non-perpendicular to the two upright portions, a retainer attached to the transverse portion and configured to retain a solar panel, at least one ballast holder connected to a respective upright and discrete ballast members in each discrete ballast holder. The at least one intermediate panel support can comprise at least two transverse portions, each transverse portion connected to a pair of opposed upright portions, the connection such that the transverse portion is non-perpendicular to the respective upright portions, wherein the transverse portions are in spaced parallel relationship with one another, at least one retainer attached to at least one transverse portion and configured to retain a solar panel, at least one discrete ballast holder connected to at least two respective uprights and sized to span the space there between and discrete ballast members in each discrete ballast holder. Affixing at least two solar panel units can comprise positioning at least two solar panels in affixed relationship to the respective transverse members in abutting relationship to one another.

Orienting the panel supports can comprise assembling the end panel supports and intermediate panel supports by connecting each one's ballast holders to the respective upright portions, orienting one of the assembled end panel supports relative to the support substrate, positioning the ballast member in the associated ballast holder, orienting the intermediate panel supports in spaced linear relationship relative to the one end panel support and positioning the ballast member in the associated ballast holders and orienting the other of the end panel supports in spaced linear relationship relative to an adjacent intermediate panel support.

The method can further comprise interconnecting at least one end panel support with a respective additional end panel support, orienting in spaced linear relationship to the additional end panel support at least one additional intermediate panel support, wherein the at least one additional intermediate panel support is positioned adjacent a respective intermediate panel support and interconnecting the at least one additional intermediate panel support to an adjacent ballast holder of the respective intermediate panel support.

Although the embodiments described herein disclose panel supports that are a contiguous piece, it is contemplated that the uprights can be separate and attached to the transverse portion of the panel supports. Although the embodiments described herein disclose the ballast holders removably connected to the panel supports, it is contemplated herein that the ballast holders be integral and contiguous with the respective panel support or supports.

Although the Figures illustrate the panel supports and ballast holders as being made of material with a particular shape, this is meant as illustration only. The panel support and ballast holders can be made of beams with a flat surface, tubes, etc.

Other embodiments of solar panel racking systems are disclosed herein.

A flat roof mount ballasted system is disclosed herein. The system comprises any number of support units depending on the number of solar panels to be used. The support units comprise at least one support member and one discrete ballast holder. At least one solar panel retainer as described above is located on each support member. Each support member comprises a first portion and a second portion extending at an angle from the first portion. These portions can be formed from one unitary piece of metal and bent to the desired angle. It is also contemplated that the support member be formed of more than one piece of metal connected such that the desired angle is formed. The first portion is configured to be substantially parallel to the substrate or roof on which the system is located. The ballast holder is positioned between the first portion and the second portion. The at least one retainer is located on the second portion.

The support units can comprise, for example, one support member and the ballast holder. The support units can also comprise at least two support members and a ballast holder. The support units can form one or more arrays as described above and are also available in a kit. The solar panels are positioned such that two or more solar panels in an array are affixed in overlying relationship to at least two support units, at least one of the support units having two support members, such that the two respective solar panels form an abutment junction seam, the abutment junction seam located medial between and parallel to the two support members.

Each ballast holder can comprise at least two elongate members. If only one support member is connected to the ballast holder, the ballast holder will also include at least two cross beams for stability. If two or more support members are connected to the ballast holder, the cross beams can be left out if desired to reduce the amount of material needed. As used herein, elongate is used to define the portions of the ballast holder perpendicular to the support member. It is contemplated that the cross beams can be of the same length as the elongate members if desired or required. However, the racks herein maximize space by maintaining a lower profile ballast system by using as small of cross beams as possible while still supporting the required ballast. The positioning of the ballast holders between the first and second portions of the support member reduces the footprint of the support units, thereby maximizing the space for solar panels. The support units can be individually positioned during installation such that any size solar panel can be used with the system.

Alternatively, the ballast holders can be made from thermoplastic, for example, by vacuum forming. The ballast holders can form a tray to hold the required amount of ballast, with the tray being positioned between the first and second portions of the support member. An electrical grounding path can be used that includes a grounding strap secured to the thermoplastic tray and configured to bridge the support members of the center support.

As used herein, "discrete" ballast holder refers to an individual ballast holder that does not abut any other ballast holder when in a rack. The ballast holders can be any length desired or required as long as they remain discrete from each other. As described herein, a ballast holder positioned between the first and second portions of the support member can be positioned so that if only one support member is used, it is centered along the ballast holder. If two or more support members are used with the ballast holder, the ballast holder will span the at least two support members. A ballast holder can be any size sufficient to hold the required ballast material, while remaining discrete. The ballast can be any weight sufficient to hold down the racks with solar panels against the elements. It is contemplated that the racking units and systems herein can be fixedly attached to the substrate on which they are to be installed, such as a roof, as desired or required. Extension of the ballast holders can be used to make an unballasted system more secure.

The retainers used to retain the solar panels on the support units can be any retainer known to those skilled in the art that is suitable for use with the panel support member. As example of a retainer is an adjustable retainer movably connected to adjust to a plurality of widths of solar panels. The retainer can comprise of a pair of attachment fixtures, each attachment fixture proximate an end of the second portion. At least one of the attachment fixtures can be movable along at least a portion of the second portion. The attachment fixture can be a top down Z-clip. A slot can be formed in the second portion to allow for movement of the attachment fixture along the slot. The attachment fixture is adjusted to conform to various sizes of solar panels. The adjustable attachment fixture is not limited to this embodiment. It is contemplated that the attachment fixture can be movably attached to the second portion without the use of the slot. As a non-limiting example, the attachment portion may include a cuff that surrounds the second portion and that can be tightened and loosened as desired or required to move the location of the attachment fixture. It is further contemplated that the retainer be one fixture having grips at opposed ends of the fixture. The fixture can be configured to telescope to adjust to varying widths of solar panels.

The support units can be made entirely of stainless steel. Stainless steel provides a material that will withstand the outdoor elements for an extended period of time without rusting. It is also contemplated that only one or both of the ballast holders and the panel support members are made of stainless steel. Other materials can be used as desired or required, but will not afford the advantages of stainless steel.

An electrical grounding path for each solar panel can be provided that allows an electrical ground path to run from along the system to include the solar panels, thereby allowing the connection of multiple solar panels in a series. Because the units are formed of a conductive material, e.g., stainless steel, the units may thereby be utilized as a portion of the electrical grounding path. Utilizing the units as part of the electrical grounding path also reduces the number of grounding clips which are required, thereby saving a significant cost.

Another embodiment of a modular racking system for solar panels can comprise a plurality of panel support assemblies. Each panel support assembly can comprise a support member comprising an elongated ramp portion and a planar portion extending from the base of the elongated ramp portion. A support rail can be attached on a top surface of the elongated ramp portion, and a retainer can be attached to the support rail and configured to retain a solar panel. A grounding clip can be configured to secure an electrical grounding path connecting the panel support assemblies, the grounding clip attached to the support rail and configured to include the solar panel in the grounding path. The planar portion of the support member extending from each elongate edge of the base of the elongated ramp portion can form ballast trays configured to support ballast weight.

The support member can be a formed thermoplastic and the support rail can be a metal such as stainless steel. The support member ramp portion can be formed at any angle desired or required to maximize energy production. It is also contemplated that the ramp portion can be flat. The planar portion extending from the base of the elongated ramp portion can be any size sufficient to support the required amount of ballast material. The planar portion can extend from one or both elongated sides of the ramp portion. When the solar panels are positioned on two of the support assemblies, both support assemblies can be entirely underneath the solar panel so that the footprint of the support system is the same as the number of solar panels used.

The support assembles are positioned individually so that the system can be used with any size solar panels. Two support assemblies can be connected together along adjacent planar portions to further maximize space. The retainer can be any of the retainers described herein. Furthermore, the grounding clip can be integral with the retainer.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An array for removably positioning a plurality of solar panels comprising:
    a plurality of discrete ballast holders configured to rest in overlying relationship to a planar support surface and configured in spaced relationship to one another;
    a plurality of panel support members, each support member having two upright portions, a transverse portion contiguously connected to and only extending between the two upright portions, and a retainer attached to the transverse portion at a location between the two upright portions and configured to retain a solar panel;
    ballast material removably positioned in more than one of the discrete ballast holders; and
    at least two solar panels, each solar panel having a top edge, a bottom edge and two opposed side edges, each solar panel attached to two of the plurality of panel support members with the retainer at an edge of the solar panel, each of the two of the plurality of panel support members supporting a solar panel being attached to a different ballast holder, wherein at least one of the plurality of discrete ballast holders is connected to four of the panel support members.

2. The array of claim 1, wherein abutting side edges of two adjacent solar panels are aligned between a pair of parallel panel support members, each support member of the pair connected to the same discrete ballast holders.

3. The array of claim 1 having a first row, wherein the first row comprises:
    at least two units, each unit comprising two discrete ballast holders and at least one panel support member extending substantially perpendicular therebetween, wherein the at least two units are positioned in spaced relationship to one another.

4. The array of claim 3 further having at least one additional row, wherein each additional row comprises:
    at least two units, each unit comprising one discrete ballast holder and at least one panel support member extending substantially perpendicular therefrom, wherein the at least one additional row is connected to the first row such that the upright portion of the panel support members opposite to the discrete ballast holders of the additional row is connected to the nearest discrete ballast holder of the first row.

5. The array of claim 4, wherein the at least one additional row is a plurality of additional rows, and wherein a subsequent additional row is connected to a preceding additional row such that the upright portion of the panel support members opposite to the discrete ballast holders of the subsequent additional row is connected to the nearest discrete ballast holder of the preceding additional row.

6. The array of claim 1, wherein each of the plurality of discrete ballast holders comprises at least two parallel elongate members spaced from each other and at least two cross beams perpendicular to the elongate members, the at least one of the panel support members connected substantially perpendicular to at least one of the elongate members.

7. The array of claim 1, wherein the retainer is comprised of a pair of attachment fixtures, each attachment fixture positioned proximate an end of the transverse portion, wherein at least one of the attachment fixtures is movable along at least a portion of the transverse portion.

8. The array of claim 1, wherein the transverse portion is configured to extend beyond a supported solar panel on each end of the transverse portion.

9. A method of positioning two or more solar panels in an array comprising:
    orienting at least three panel supports in linear relationship to one another on a support substrate, wherein each panel support comprises:
        at least one transverse portion having a first end connected to a first leg member and a second end connected to a second leg member; a retainer attached to the at least one transverse portion and configured to retain a solar panel; at least one ballast holder connected to one of the first and second leg; and discrete ballast members in each discrete ballast holder;
    positioning at least two solar panels in overlying relationship to two of the at least three panel supports and in abutting relationship to one another such that the abutting solar panels form an abutment junction seam, the solar panels positioned such that the abutment junction seam is located medial between and parallel to two transverse portions connected to the same discrete ballast holder; and
    retaining the positioned solar panels in affixed relationship to the panel support.

10. The method of claim 9 wherein orienting the panel supports comprises:
    assembling the panel supports by connecting each one's ballast holders to the respective first or second leg;
    orienting a first of the assembled panel supports relative to the support substrate;
    positioning the ballast member in the associated ballast holder;
    orienting a second panel support in spaced linear relationship relative to the first panel support and positioning the ballast member in the associated ballast holder; and
    orienting a third panel support in spaced linear relationship relative to the second panel support.

11. The method of claim 10 further comprising:
   interconnecting an additional panel support with the first panel support such that a new row is formed;
   orienting in spaced linear relationship to the additional panel support another additional panel support, wherein the another additional panel support is in spaced relation to the additional panel support; and
   interconnecting the another additional panel support to the adjacent ballast holder of the second panel support.

12. The method of claim 9, wherein the first leg has a first length and the second leg has a second length, the first length being different than the second length.

13. A solar panel array kit comprising:
   at least two end unit elements, the end unit elements each including at least one ballast holder, at least one solar panel support member attachable to the at least one ballast holder and means for connecting the at least one ballast holder to the at least one solar panel support member;
   at least one center unit element, the center unit element including two discrete ballast holders, at least two solar panel support members attachable to the ballast holders and means for connecting the respective ballast holders to the solar panel support members, wherein the respective ballast holders are configured to removably receive a ballast material, wherein each of the solar panel support members is a unitary member having two bends along its length, each bend having an angle of over forty-five degrees;
   a plurality of solar panel retention clips; and
   a plurality of solar panels, the solar panels configured to be placed in overlying relationship with the solar panel support members on a portion of the solar panel support members between the two bends, when the respective end units and center unit elements are in spaced relationship on a substrate surface.

14. The solar panel array kit of claim 13 wherein the solar panel retention clips are movably positionable on the respective solar panel support member between the two bends.

15. The solar panel array kit of claim 13 wherein each ballast holder of each central unit element is configured to be connected to up to two additional solar panel support members from up at least one additional end unit or center unit.

16. The solar panel array kit of claim 13 wherein the respective solar panel support members each include a pair of opposed legs, each of the opposed legs having a length different from the other.

* * * * *